(No Model.)

S. H. LIMBERT.
HOSE COUPLING.

No. 549,733. Patented Nov. 12, 1895.

Witnesses
Jas. C. Dawley.
N. M. McNair.

Inventor
Samuel H. Limbert,
By his Attorney
H. A. Toulmin

ANDREW B.GRAHAM. PHOTO-LITHO. WASHINGTON, D.C.

UNITED STATES PATENT OFFICE.

SAMUEL H. LIMBERT, OF SPRINGFIELD, OHIO, ASSIGNOR OF ONE-HALF TO ANTON PRELLER, OF SAME PLACE.

HOSE-COUPLING.

SPECIFICATION forming part of Letters Patent No. 549,733, dated November 12, 1895.

Application filed June 28, 1895. Serial No. 554,311. (No model.)

*To all whom it may concern:*

Be it known that I, SAMUEL H. LIMBERT, a citizen of the United States, residing at Springfield, in the county of Clark and State of Ohio, have invented certain new and useful Improvements in Hose-Couplings, of which the following is a specification, reference being had therein to the accompanying drawings.

This invention relates to certain new and useful improvements in hose-coupling.

The objects of this invention have reference, first, to a coupling which may be readily coupled and uncoupled when the full water-pressure is on by the means hereinafter described, and particularly pointed out in the claims, and, second, to overlapping the adjacent ends of the coupling members, providing one member with locking-slots and the other with locking-pins, and a locking-spring to hold the pins, with devices to protect the spring against external injury and unskillful manipulation, as will be hereinafter more fully pointed out, and stated in the claims.

Figure 1:
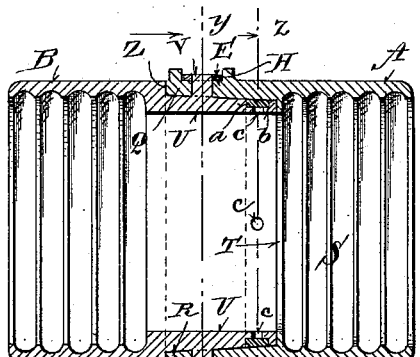
Figure 4:
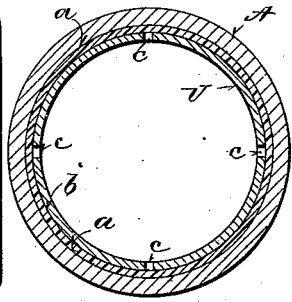
Figure 2:
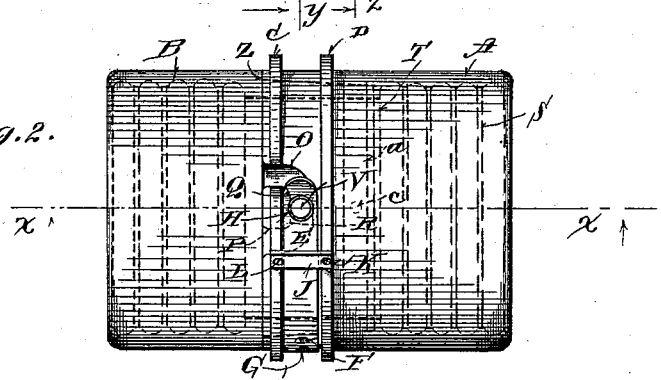
Figure 3:
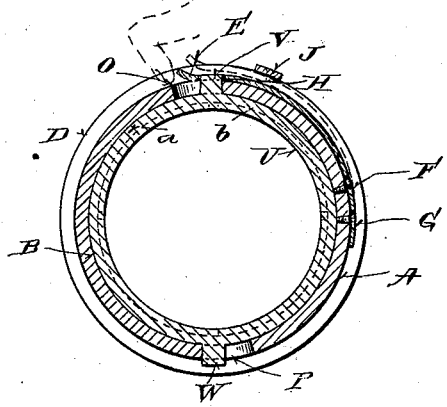

In the accompanying drawings, on which like reference-letters indicate corresponding parts, Figure 1 is a longitudinal sectional view on the line $x\,x$ of Fig. 2; Fig. 2, a plan view; Fig. 3, a transverse sectional view on the line $y\,y$ of Fig. 1, and Fig. 4 a transverse sectional view on the line $z\,z$ of Fig. 1.

The letter A represents the female member of my improved coupling, and the letter B the male member. On the outside of this female member are cast or otherwise secured thereto two beads or rings C and D, which form a protection for a spring E, carried between them. This spring E conforms to the exterior of the section and is secured at one end by one or more screws F and G or other fastening device and has a hole H near its free end to adapt it to fit over a lug V, presently to be described. As shown in Fig. 3, the free end of said spring is also slightly curved outward, so as to take hold of it and raise it when it is desired to do so. In order to limit the outward movement of the spring E and also to prevent straining and breaking the same, I provide a cross-piece J, extending over said spring and secured to the rings by screws K and L, or it may be cast thereto, as desired.

Referring to Figs. 2 and 3 it will be seen that the female member is provided, preferably at diametrical points, with slots O and P, of the form shown, and which extend in opposite directions. By making these slots in this manner two shoulders or projections Q and R are formed, also extending in opposite directions.

Referring now to the interior of the female member, it will be seen that I have provided internal corrugations S, the same as in the ordinary coupling, and also an internal annular projection or ring T, preferably cast thereto. Against this ring the hose is adapted to abut. On the other or inner side of said ring the female member is slightly flared, so as to more readily admit the male member, which I will now describe.

The letter U represents an annular reduced portion slightly tapered to fit within and match the female member. On said reduced portion are cast lugs V and W, preferably round, and which are adapted to fit the slots O and P, respectively, of the female member, and when one or the other of said members is slightly turned said lugs are held in position by the spring E closing over one of them, and the parts are prevented from pulling apart by said lugs coming in contact with the shoulders Q and R of the female member. When the parts are in coupled position, the female member fits snugly against the shoulder Z on the male member. In order to prevent any water escaping through the joints, an elastic packing-ring $a$, preferably made of rubber, is placed in a groove $b$ on the reduced portion U of the male member, near its inner end, as seen in Fig. 1. In order to force the packing-ring tightly against the female member, holes $c$ lead to the inner surface of the packing-ring, through which water is forced by the pressure to expand the packing-ring, and thus prevent any water escaping. The interior outer end of said male member is also corrugated to receive the line-pipe or hose, and the reduced portion U forms a shoulder against which the hose abuts when in position. The interior surface of the hose in the male member, reduced portion of said member, the internal extension of the female member, and the interior of the hose of said member are all in the same plane, so that there is no obstruction to the free passage of the water through the entire line of hose. Thus it will be seen that in this coupling there is provided a quick and ready means for strongly uniting the two members and that the locking-pins are held by a spring-catch, while the catch itself is protected against being broken or bent by the rough use to which the coupling is subjected in times of fire, such protection being afforded by the rings or beads. Incidentally, too, the spring is protected against being broken or sprung too far out, as might be done by an excited fireman, such latter protection to the spring being afforded by the cross-bar J. Then the possibility of leakage in the joint between the members is reduced to the very minimum, because, aside from the packing-ring under pressure of the water itself, there are right-angle joints and a long tapering contact-surface between the respective members. The provision of flushness of the interior, together with the long tapering meeting ends, enables one to couple these members while the water is flowing out of one of them, a valuable feature in practice.

Having thus fully described my invention, what I claim as new, and desire to secure by Letters Patent, is—

1. In a hose coupling, the combination with a female member flared outward at one end on the interior and having slots extending through its walls, a male member tapered to fit said female member, and carrying pins adapted to fit the slots in said member, a spring carried by said female member and adapted to snap over one of the pins on said male member, and protecting surfaces on each side of said spring whereby the spring is afforded protection.

2. In a hose coupling, the combination with a female member having one or more locking slots through the walls thereof, a locking spring secured thereto and lying in a circumferential direction, and a ring or bead at each side of said spring, and a stop-bar for the spring with a male member having a locking pin adapted to enter and extend through each of said slots, and over one of which pins the spring snaps.

3. In a hose coupling, the combination with the female member having one end tapered on the inside, one or more locking slots and exterior rings, a spring secured between the rings, and a stop-bar therefor, with the male member having a tapering reduced portion adapted to fit within the other tapering portion and provided with one or more locking pins arranged to enter said slots, and one of such pins to be held by said spring.

In testimony whereof I affix my signature in presence of two witnesses.

SAMUEL H. LIMBERT.

Witnesses:
OLIVER H. MILLER,
W. M. McNAIR.